US006851511B2

(12) United States Patent
Tenghamn (10) Patent No.: US 6,851,511 B2
(45) Date of Patent: Feb. 8, 2005

(54) DRIVE ASSEMBLY FOR ACOUSTIC SOURCES

(76) Inventor: Stig Rune Lennart Tenghamn, 3303 Sage Ter., Katy, TX (US) 77450

( * ) Notice: Subject to any disclaimer, the term of this patent is extended or adjusted under 35 U.S.C. 154(b) by 0 days.

(21) Appl. No.: 10/160,230

(22) Filed: May 31, 2002

(65) Prior Publication Data

US 2003/0221901 A1 Dec. 4, 2003

(51) Int. Cl.[7] .................................................. G01V 1/04
(52) U.S. Cl. ......................................................... 181/121
(58) Field of Search ................................. 181/121, 102, 181/108, 110, 113, 122

(56) References Cited

U.S. PATENT DOCUMENTS

| | | | |
|---|---|---|---|
| 3,578,102 A | | 5/1971 | Ross et al. |
| 4,014,403 A | | 3/1977 | Mifsud |
| 4,207,962 A | * | 6/1980 | Bouyoucos ................. 181/119 |
| 4,410,062 A | | 10/1983 | Mifsud |
| 4,785,430 A | | 11/1988 | Cole |
| 5,031,718 A | | 7/1991 | Peavey |
| 5,050,129 A | * | 9/1991 | Schultz ......................... 367/21 |
| 5,447,001 A | * | 9/1995 | Nishimura et al. ......... 52/167.2 |
| 5,959,939 A | | 9/1999 | Tengham et al. |
| 6,464,035 B1 | * | 10/2002 | Chelminski ................. 181/120 |
| 6,488,117 B1 | * | 12/2002 | Owen .......................... 181/121 |

FOREIGN PATENT DOCUMENTS

RU 2028647 2/1995

OTHER PUBLICATIONS

F.S. Kramer, R.A. Peterson, W.C. Walter, "Seismic Energy Sources", 1968 Handbook 38th Annual Meeting of the SEG.
W. E. Liang, Appendix B: "History and early development of the vibroseis system of seismic exploration", VIBROSEIS, 749–765, Geophysics Reprint Series No. 11 (1989).
W. E. Lerwill, "The Amplitude and Phase Response of a Seismic Vibrator", Geophysical Prospecting, vol. 29, 503–529 (1981).
Guido Baeten, Jacob Fokkema & Anton Ziolkowski, "The marine vibratorsource", First Break, vol. 6, No. 9 ((Sep. 1988).

* cited by examiner

Primary Examiner—Kimberly Lockett
(74) Attorney, Agent, or Firm—E. Eugene Thigpen (57) ABSTRACT

In one embodiment of the present invention, a drive assembly for a seismic land vibrator is provided. The drive assembly comprises at least a first spring element. The first spring element operates in at least two vibration modes in a seismic frequency band of interest. The drive assembly also comprises a baseplate, a driver, and a reaction mass. The driver interacts with the reaction mass and the first spring element to transfer energy to the baseplate.

16 Claims, 11 Drawing Sheets

DRIVE ASSEMBLY FOR ACOUSTIC SOURCES

BACKGROUND OF THE INVENTION

The vibroseis system is an engineered system that commonly uses hydraulically operated vibrators to send continuous acoustic signals (instead of shock-waves) through the earth. The vibroseis signal is normally a swept-frequency sinusoid (called a "sweep"). In general, the sweep is from 3 to 24 seconds, but any length is possible. A vibroseis field recording is then converted into a "conventional" seismogram by the cross-correlation of each trace of the vibroseis field record with the transmitted sweep. The principle of vibroseis is well known in the art and is presented, for example, in W. E. Liang, *Appendix B: History and Early Development of the Vibroseis System of Seismic Exploration*, VIBROSEIS, 749–765, GEOPHYSICS REPRINT SERIES NO. 11 (1989), incorporated herein by reference.

Figure 1:
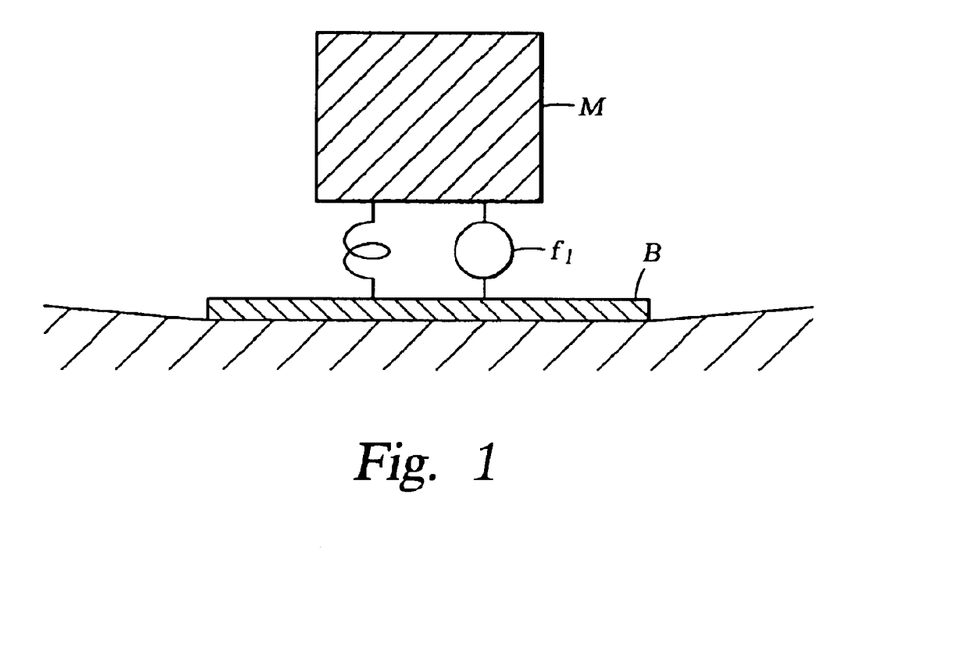
FIG. 1 shows an example of a conventional vibrator.
Figure 2:
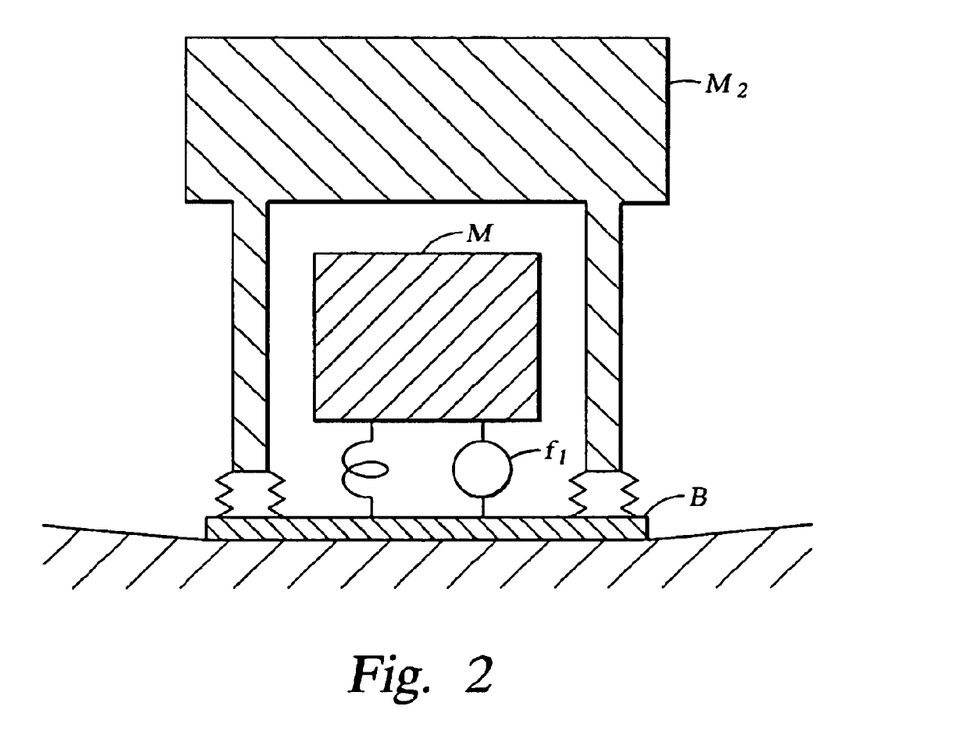
FIG. 2 shows another example of a conventional vibrator.

When vibroseis was first released, it was thought to be the means of perfect control over the spectrum of the seismic wavelet. But today, even though it has proven to be very successful, vibroseis could hardly claim to give perfect control over the source, or even to know exactly what the power spectrum is at the source. The basic conventional compressional wave vibrator in current practice is illustrated in FIG. 1. A swept frequency drive force is applied between the baseplate B and a reaction mass M from a generator $f_1$, which may be an electrodynamic or hydraulic driver. As illustrated in FIG. 2, a hold down mass $M_2$ may be used to hold the baseplate B in contact with the ground.

The function and design of various conventional vibrators are well known in the art. For further discussions on vibrators and vibroseis, readers are directed to W. E. Lerwill, *The Amplitude and Phase Response of a Seismic Vibrator*, GEOPHYSICAL PROSPECTING, Vol. 29, 503–528 (1981); F. S. Kramer, R. A. Peterson & W. C. Walter, *Seismic Energy Sources* 1968 *Handbook*, 38th ANNUAL MEETING OF THE SEG (1968); Guido Baeten, Jacob Fokkema & Anton Ziolkowski, *The Marine Vibrator Source*, FIRST BREAK, Vol. 6, No. 9 (September 1988); R. W. Time, A. M. Young, and J. E. Blue, *Transducer Needs for Low Frequency Sonar*, PROCEEDINGS OF THE SECOND INTERNATIONAL WORKSHOP ON POWER TRANSDUCERS FOR SONICS AND ULTRASONICS (1990); U.S. Pat. No. 5,959,939; all incorporated herein by reference.

Both conventional hydraulic and electrodynamic vibrator designs have a fundamental problem related to the mechanical impedance of the system. At low frequencies, the spring (hydraulic fluid in the hydraulic version or suspension spring in the electrodynamic version) has a large value compared to the impedance from the reaction mass. At high frequencies, the system becomes more influenced by the impedance from the reaction mass. This is easy to understand from the formula below.

R is the damping and describes how much energy can be transmitted into the ground. f is the frequency, m is the mass and k is the spring constant for the system. As will occur to $$Z = R + 2\pi f \cdot m \cdot j - \frac{k}{2\pi f} \cdot j$$

those of ordinary skill in the art, when f is low, the system will be dominated by the spring, and when f is high, the system will be dominated by the mass. In practice, this means that the vibrator works well when the ground conditions are such that a good impedance match between the vibrator and the ground can be achieved. This is seldom the case. When the vibrator is poorly matched with the ground, the system has low efficiency for parts of the frequency spectrum—usually, the lower frequencies. The low efficiency reduces the control over the vibrator and generates harmonic distortion. Thus, there is a long felt need for a vibrator with increased efficiency, improved control over the frequency spectrum of the source, and matched impedance with the earth.

SUMMARY OF THE INVENTION

In one embodiment of the present invention, a drive assembly for a seismic land vibrator is provided. The drive assembly comprises at least a first spring element. The first spring element operates in at least two vibration modes in a seismic frequency band of interest. The drive assembly also comprises a baseplate, a driver, and a reaction mass. The driver interacts with the reaction mass and the first spring element to transfer energy to the baseplate.

In a further embodiment, a water bottom vibrator is provided. The vibrator comprises a baseplate, a cover, and a decoupler. The movement of the baseplate is decoupled from the movement of the cover.

In a further embodiment, a system for generating a swept frequency signal is provided. The system comprises means for generating at least two resonance frequencies within a seismic frequency band of interest, and means for emitting at least two resonance frequencies within a seismic frequency band of interest.

BRIEF DESCRIPTION OF THE FIGURES

Example embodiments of the present invention are more fully described in detail by referring to the following drawings.

DETAILED DESCRIPTION OF EXAMPLE EMBODIMENTS OF THE PRESENT INVENTION

In one example embodiment of the present invention, a drive assembly for a seismic land vibrator is provided. As illustrated in FIGS. 3–8, the drive assembly comprises at least a first spring element 1, which operates in at least two vibration modes in a seismic frequency band of interest. In various embodiments of the present invention, the first spring element 1 is caused to operate in two vibration modes in both single spring embodiments and plural spring embodiments. To teach the broad aspect of the present invention, examples of plural spring embodiments are described first. After describing the plural spring embodiments, the generalized single spring embodiments will be more easily understood.

Figure 3:
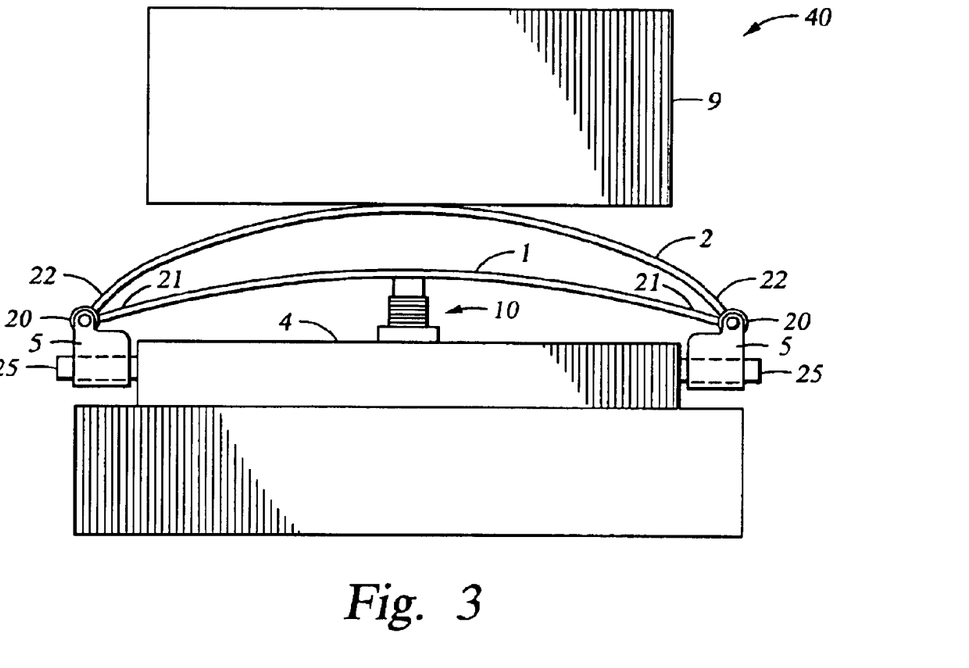
FIG. 3 shows an example plural spring embodiment of the present invention from the side.

In one plural spring embodiment, as illustrated in FIG. 3, the drive assembly 40 comprises a first spring element 1, and second spring element 2, a baseplate 8, a driver 10, and a reaction mass 9. The driver 10 is in communication with the first spring element 1. The first spring element 1 is in communication with the second spring element 2. The second spring element 2 is in communication with the reaction mass 9.

The arrangement of the first spring element 1 and the second spring element 2 further comprises a mechanical transformer. As a mechanical transformer, force is transferred and transformed from the driver 10 to the reaction mass 9 via the first spring element 1 and the second spring element 2. A force exerted on the first spring element 1 by the driver 10 is transferred to the second spring element 2, and then to the reaction mass 9. The first spring element 1 and second spring element 2 change the relationship between amplitude and force. For example, a large movement of the driver 10, but with relatively small force, will cause a relatively small movement to the ends 21 of the first spring element 1 which will transfer the force to the ends 22 of the second spring element 2, and then to the reaction mass 9. This causes the amplitude at the reaction mass 9 to be smaller, but the force is increased. Like pushing a wall, the reaction mass 9 then returns the force to the first spring element 1 at the ends 21 of the first spring element 1 via the second spring element 2. This forces the baseplate 8 and thus, the earth. The force at the end 21 of the first spring element 1 causes the first spring element 1 to operate in at least two vibration modes in the seismic frequency band of interest.

Figure 4A:
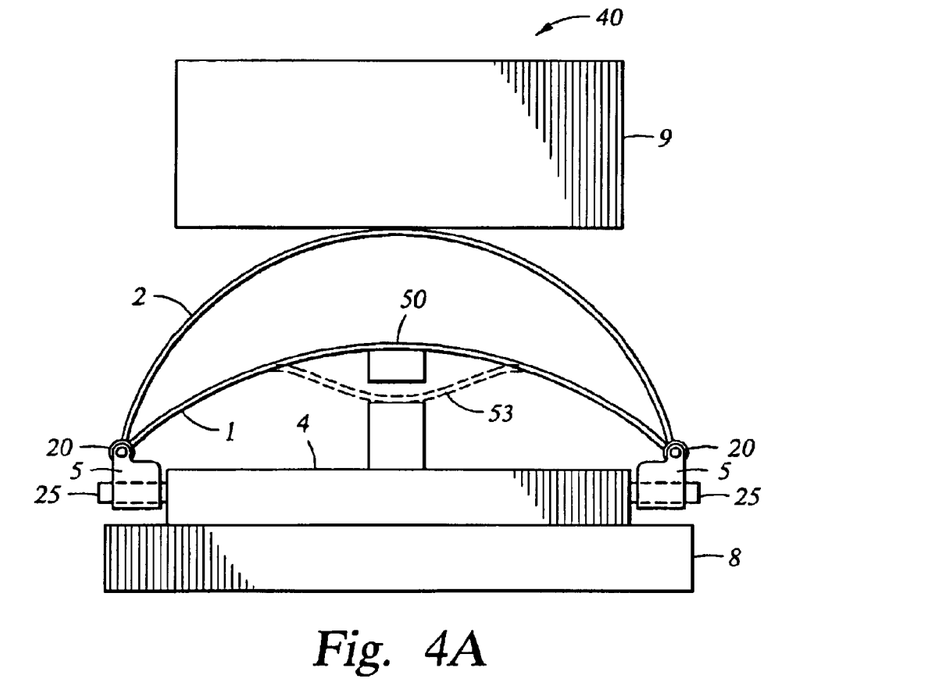
FIG. 4A shows aspects of an example plural spring embodiment of the present invention.
Figure 4B:
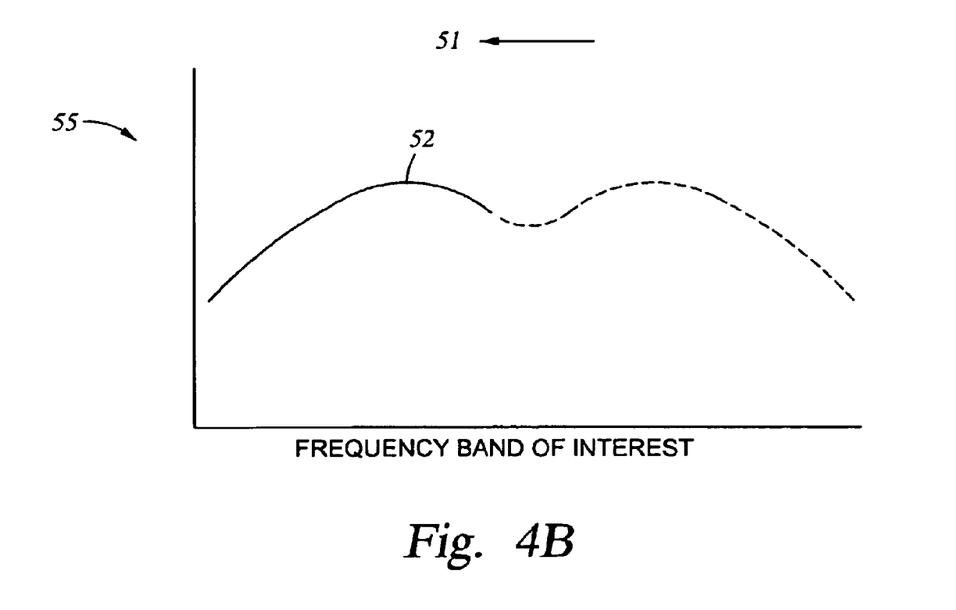
FIG. 4B illustrates a first resonant frequency.

As illustrated in FIG. 4A and FIG. 4B, in operation, in one example embodiment, at least the first spring element 1 has a first resonance frequency 52 in a first vibration mode 50, in the lower end 51 of a seismic frequency band of interest 55. In FIG. 4A, the first vibration mode 50 is illustrated in the figure of the drive assembly with the first spring element 1 operating in the first vibration mode 50. The first vibration mode 50 is illustrated with a solid line, while the second vibration mode 53 is illustrated with dotted line. The first resonance frequency 52 corresponding to this first vibration mode 50 is graphed in FIG. 4B.

Figure 5A:
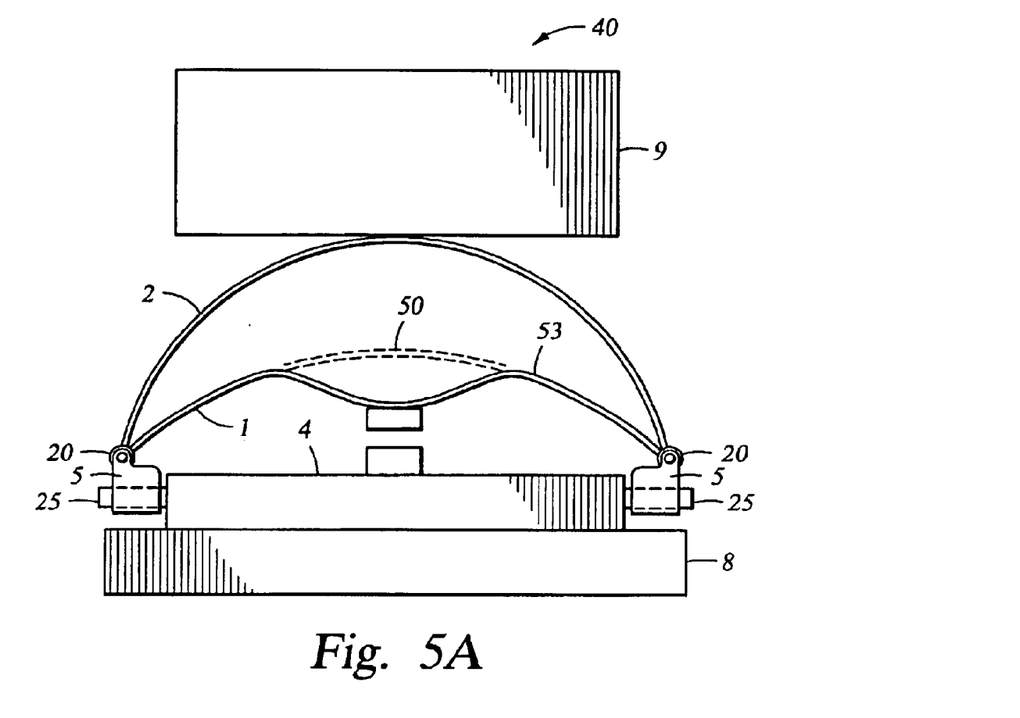
FIG. 5A shows aspects of an example plural spring embodiment of the present invention.
Figure 5B:
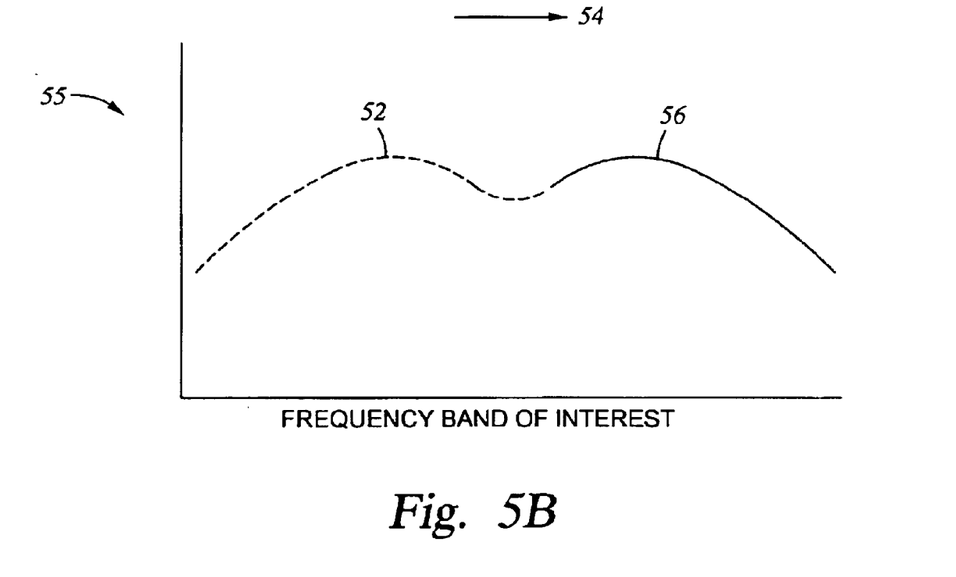
FIG. 5B illustrates a second resonant frequency.

As illustrated in FIGS. 5A and 5B, at least the first spring element 1 has a second resonance frequency 56 in a second vibration mode 53 in the upper end 54 of a seismic frequency band of interest 55. Here, the second vibration mode 53 and corresponding second resonance frequency 56 is illustrated with the solid line and the first vibration mode 50 and first resonance frequency 52 is illustrated with a dotted line. The second resonant frequency 56 corresponding to the second vibration mode 53 is graphed in FIG. 5B.

Figure 6:
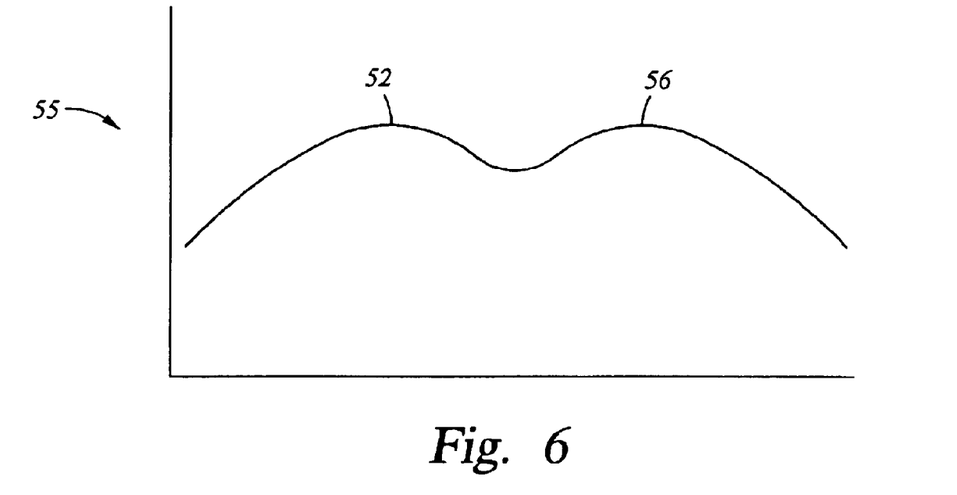
FIG. 6 shows further aspects of an example embodiment of the present invention.

As illustrated in FIG. 6, by operating in at least two vibration modes in a seismic frequency band of interest, the vibrator has an improved response in the frequency band of interest 55. The exact location of the first resonance frequency 52 and the second resonance frequency 56 in the frequency band of interest 55 will vary, in various embodiments, depending on numerous factors such as the type, shape, size, and material of the spring elements 1, 2, reaction mass 9, baseplate 8, or any other components of the vibrator. These components are widely available and known to those of ordinary skill in the art.

In alternate embodiments, the resonance frequencies 52, 56 are determined rather freely to obtain a good impedance match with the earth for the whole frequency band of interest 55. The first resonance frequency 52 is determined by the mass-spring relationship between the two spring elements 1, 2 and the reaction mass 9 when at least the first spring element 1 is operating in its first vibration mode 50. The second resonance frequency 56 is determined when the first spring element 1 in communication with the driver 10 has its second vibration mode 53. In further embodiments, these two resonance frequencies 52, 56 are achieved by selecting the proper material properties in the spring elements 1, 2 in combination with the reaction mass 9 and driver 10. In still a further embodiment, the spring elements 1, 2, driver 10, and reaction mass 9 are selected empirically.

In the embodiment of FIG. 3, the first spring element 1 and the second spring element 2 are bowed. That is, the first spring element 1 is secured on either end 21 causing an arched or bowed shape, which acts as a spring element. Similarly, the second spring element 2 is also secured on either end 22 causing it to bow and act as a spring element. In alternate embodiments, the first spring element 1 and the second spring element 2 comprise flexible rods, plates, straight springs, or any other spring element made of appropriate materials as will occur to those of ordinary skill in the art.

Figure 7:
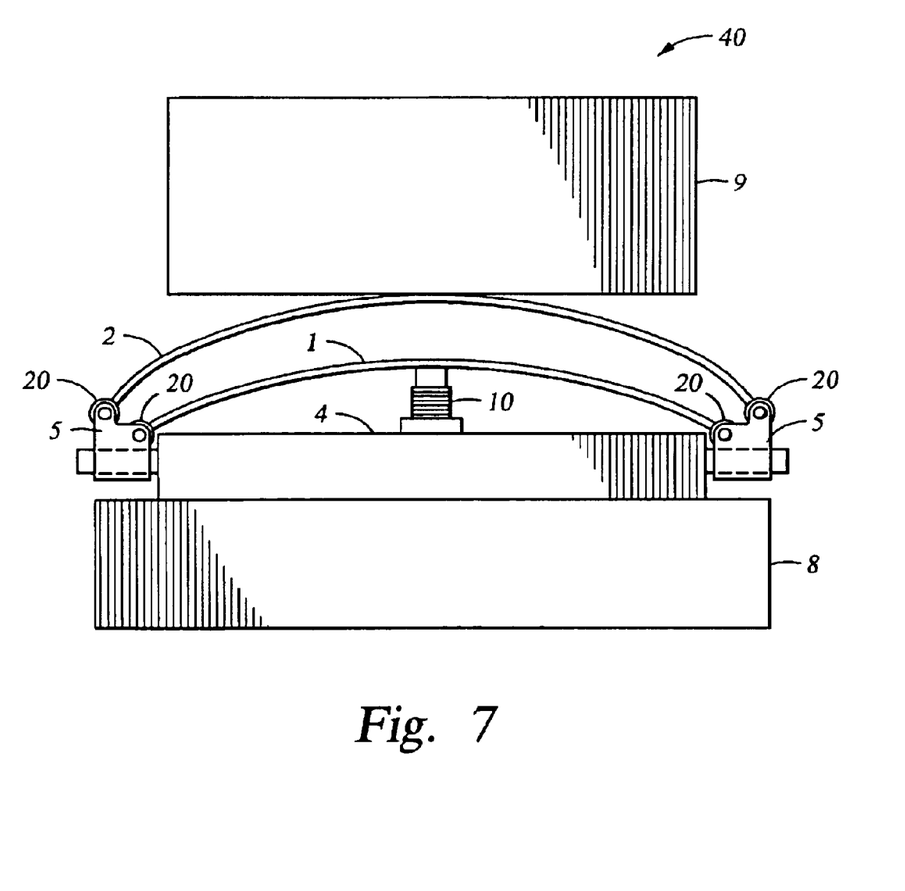
FIG. 7 shows a further example embodiment of the present invention.

Furthermore, in some embodiments, components 1, 2, 10, 8, 9, are in communication by direct contact, while in others, components are not in direct contact. As illustrated in FIG. 3, in some embodiments, to be in communication, the first spring element 1 and the second spring element 2 are in actual contact and held together by hinges 20, fastening devices 5, or any other component that will occur to those of ordinary skill in the art. However, as illustrated in FIG. 7, in alternate embodiments, the first spring element 1 is in communication with the second spring element 2 through hinges 20, fastening device 5 or any other component (or series of components) in contact with the first spring element 1 and the second spring element 2. Similarly, in alternate embodiments, the driver 10, the first spring element 1, the second spring element 2 and the reaction mass 9, or any other components may be in communication through direct contact, through another component, or through a series of components. As will become apparent, by various components being in communication, the movement or energy of the driver 10 is transferred to the baseplate 8 and the earth. As will occur to those of ordinary skill, the two spring elements 1, 2 do not have to be in actual contact to transfer energy.

Figure 8:
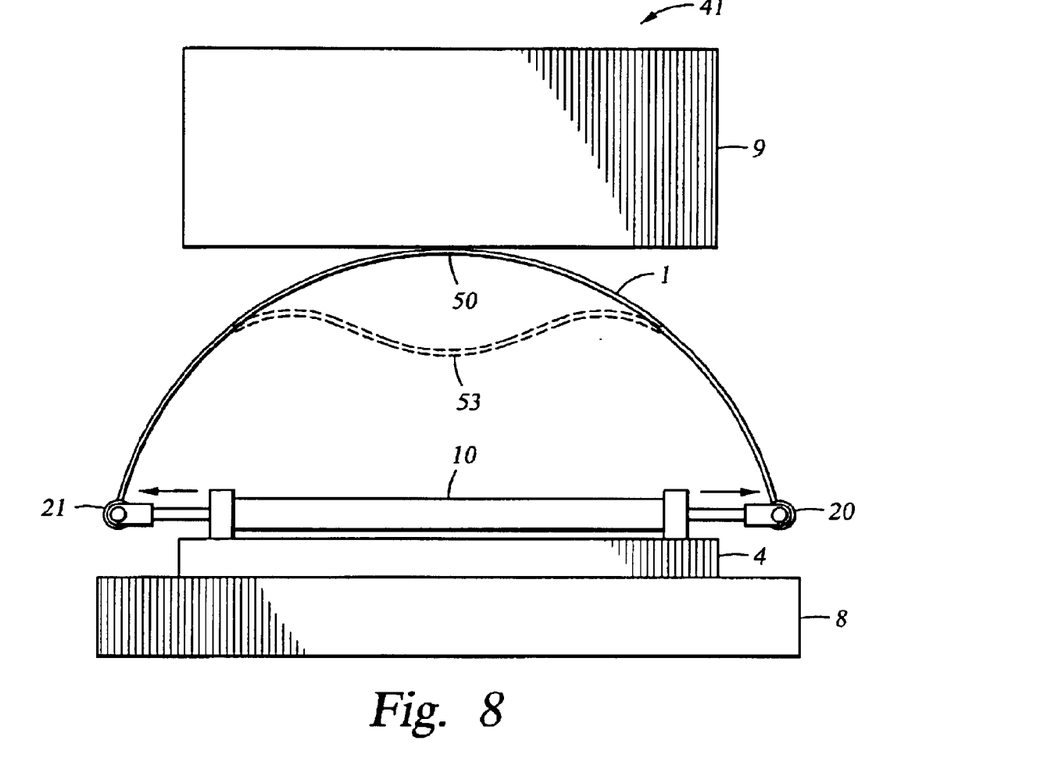
FIG. 8 shows aspects of a single spring element embodiment of the present invention.

Turning now to another embodiment, as illustrated in FIG. 8, a single spring drive assembly 41 is also provided. The first spring element 1 is caused to operate in at least two vibration modes 50, 53 in a seismic frequency band of interest without the use of a second spring element 2. Instead of using a plurality of spring elements 1, 2, the driver 10 directly forces an end 21 of the first spring element 1. In one embodiment, the driver 10 is horizontally positioned to force the end 21 of the first spring element 1. As with previous embodiments, the force is returned by the reaction mass 9 to the baseplate 8 and the earth. In alternate embodiments, single or multiple drivers 10 are used to force the first spring element 1 into operating in at least two vibration modes 50, 53 in a seismic frequency band of interest.

Figure 9:
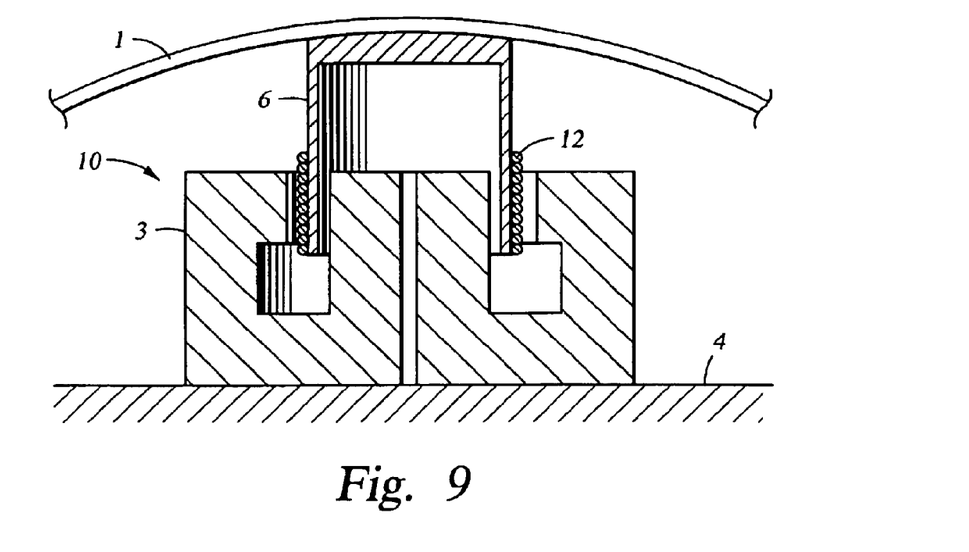
FIG. 9 shows an example of an electrodynamic driver.

In various alternate embodiments the driver 10 is a hydraulic piston-cylinder assembly, as shown in FIG. 8, a piezo-ceramic driver, a magnetostrictive driver, or any other driver that will occur to those of ordinary skill in the art. As illustrated in FIG. 9, in one embodiment, the driver 10 comprises two drive parts 3, 6. The first drive part 3 is fastened to the frame 4 and comprises a permanent magnetic material. The second drive part 6 is fastened to a spring element 1 and comprises a coil 12. When a current is sent through the coil 12, a magnetic field is created. The magnetic field will interact with the field from the permanent magnet of the first drive part 3 and provide relative movement of the parts. The resulting force is expressed as:

$$F = I \cdot l \cdot B$$

I is the current in the coil. l is the length of the conductor and B is the magnetic flux density.

Figure 10A:
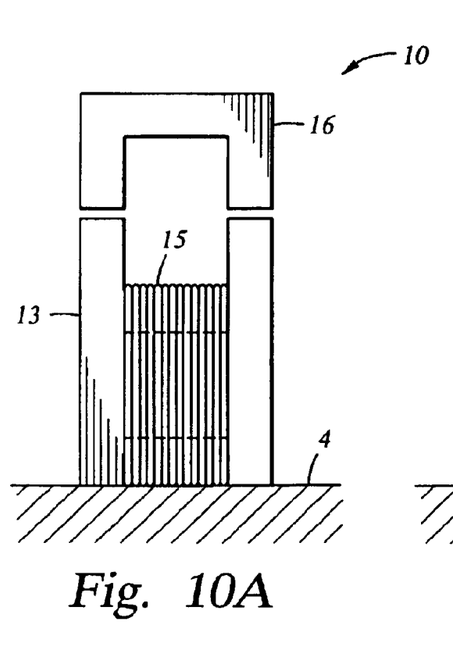
FIG. 10A and FIG. 10B show a front view and a side view, respectively, of another example of an electrodynamic driver.
Figure 10B:
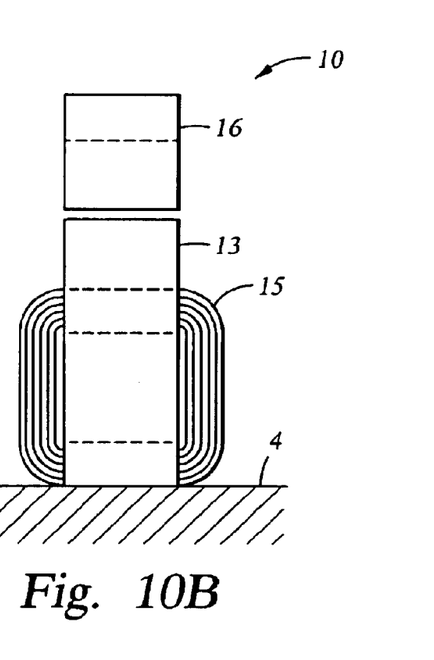

FIGS. 10A and 10B shows an alternate electromagnetic driver from both the front and the side. The driver 10 comprises a first drive part 13 and a second drive part 16. In driver 10, a coil 15 is positioned in the first drive part 13, which is connected to the frame 4. The second drive part 16 of driver 10 is the passive magnetic elements, which are connected to the first spring element 1. In alternate embodiments, the first drive part 13 and the second drive part 16 are made of iron or other material having similar qualities that will occur to those of ordinary skill in the art. The coil 15 encloses a core of magnetic material. The magnetic field is guided out towards the second magnetic drive parts 16. The resulting force F is expressed as:

$$F = \frac{N^2 I^2}{r_{tot}^2 \mu_{gap} \mu_0 A}$$

N is the number of windings. I is the current. $r_{tot}$ is the reluctance. $\mu_{gap}$ is permeability number, $\mu_0$ is the permeability, in vacuum and A is the area.

Figure 11:
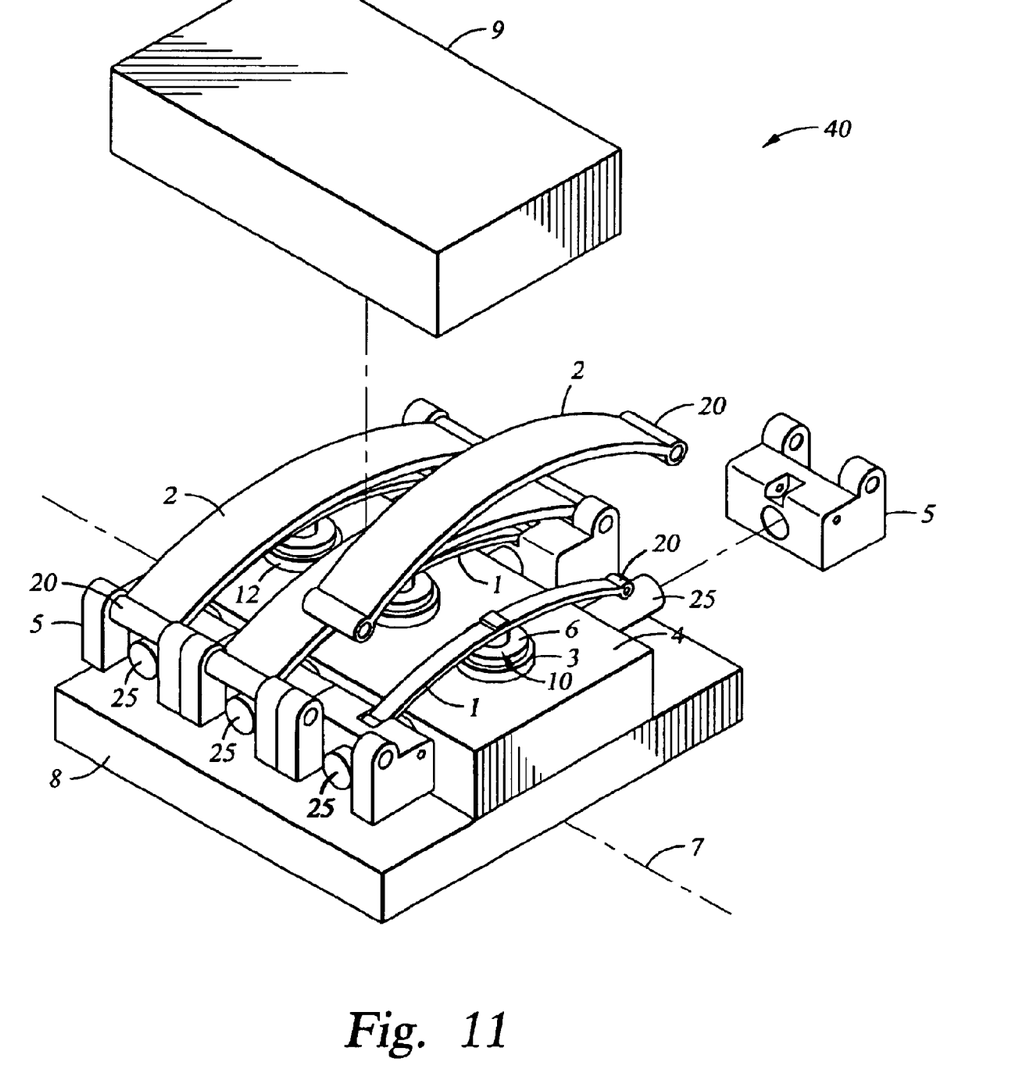
FIG. 11 shows a further plural spring example embodiment of the present invention from an exploded view.
Figure 12:
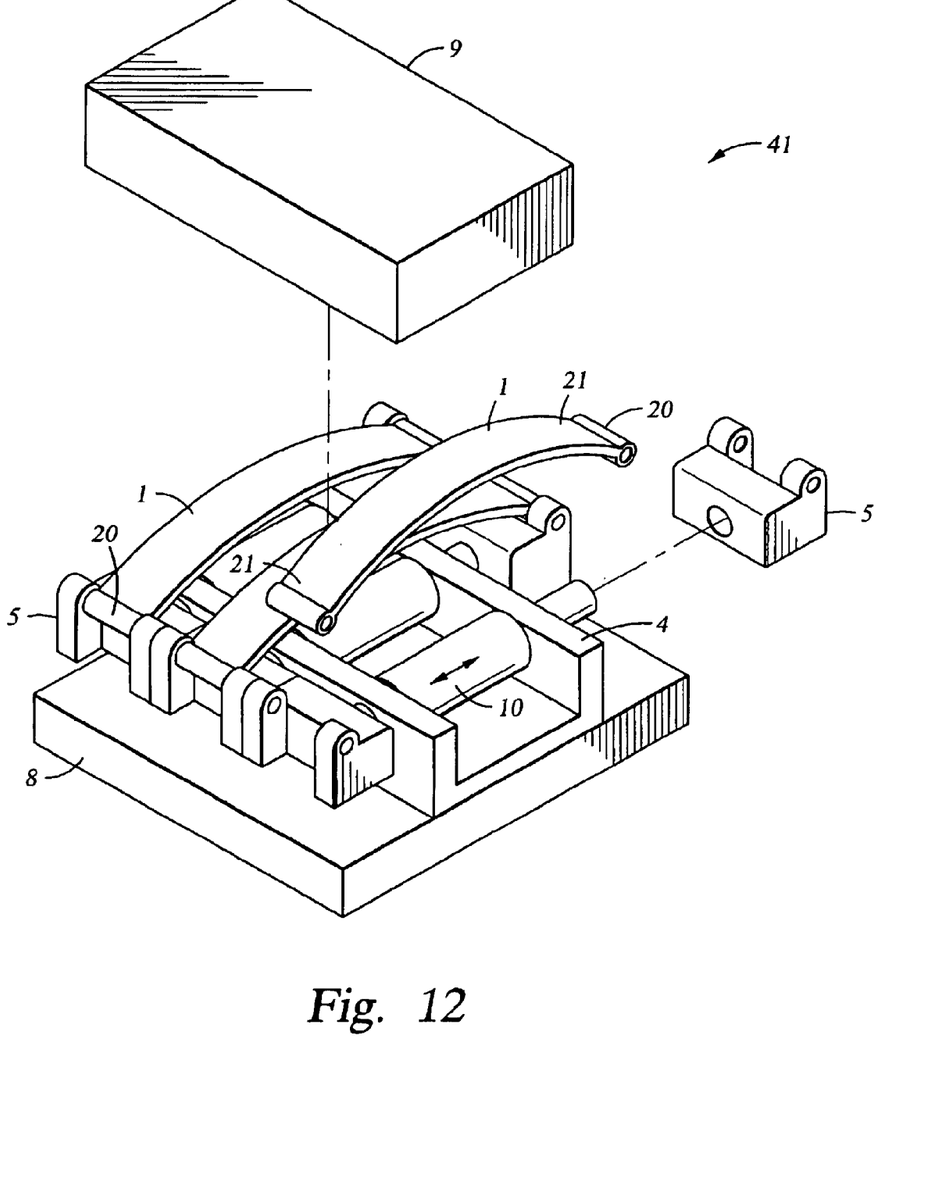
FIG. 12 shows a further single spring example embodiment of the present invention from an exploded view.
Figure 13:
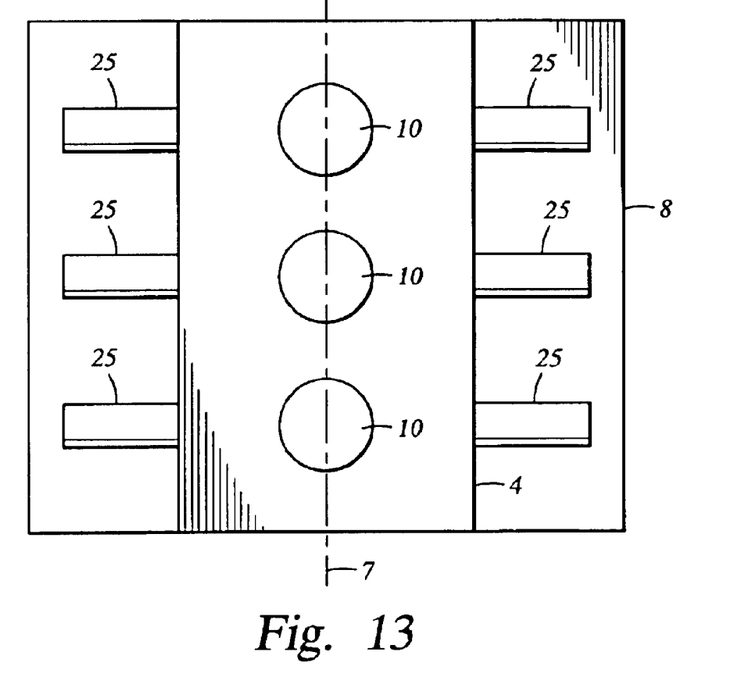
FIG. 13 shows aspects of another example embodiment of the present invention from the top.

Turning now to FIG. 11, FIG. 12, and FIG. 13, in further embodiments, the drive assembly comprises a series of spring elements 1. As illustrated in FIG. 11, the drive assembly 40 comprises a series of first spring elements 1 and a series of second spring elements 2. The series of spring elements 1, 2 are perpendicular to axis 7 of the drive assembly 40, with one or more drivers 10 secured to each first spring element 1. The first spring element 1 and the second spring element 2 are each attached to a fastening device 5 with hinges 20. Each fastening devise 5 is slideable on rods 25, extending from frame 4, which is secured to the baseplate 8. The reaction mass 9 is secured on the second spring element 2. The embodiment of FIG. 11 uses the driver of FIG. 9. In alternate embodiments, depending on the desired force, either the size of the driver 10 or the number of drivers 10 are varied.

FIG. 12 illustrates a further embodiment of drive assembly 41, with a series of single spring elements 1, without second spring elements 2. In the illustrated embodiment, a series of first spring elements 1 are in communication with the reaction mass 9. The first spring element 1 is attached to fastening device 5 with hinges 20. Each fastening device 5 is secured to rods 25 extending from frame 4. The frame 4 is then secured to the baseplate 8. A series of drivers 10 are horizontally positioned at each first spring element 1 to force ends 21 of the first spring elements 1 into operating in at least two vibration modes in the frequency band of interest.

FIG. 13 illustrates the symmetry of the embodiment of FIG. 11 from the top. It is advantageous for the sum of the forces on each side of the frame 4 to be symmetric relative the frame axis 7 to minimize the strain on the construction. It is also an advantage if the sum of the forces results in a vector being perpendicular to the main axis of the baseplate 8. In alternate embodiments, the shape, size, or dimensions of the components are altered as will occur to those of ordinary skill in the art.

Figure 14:
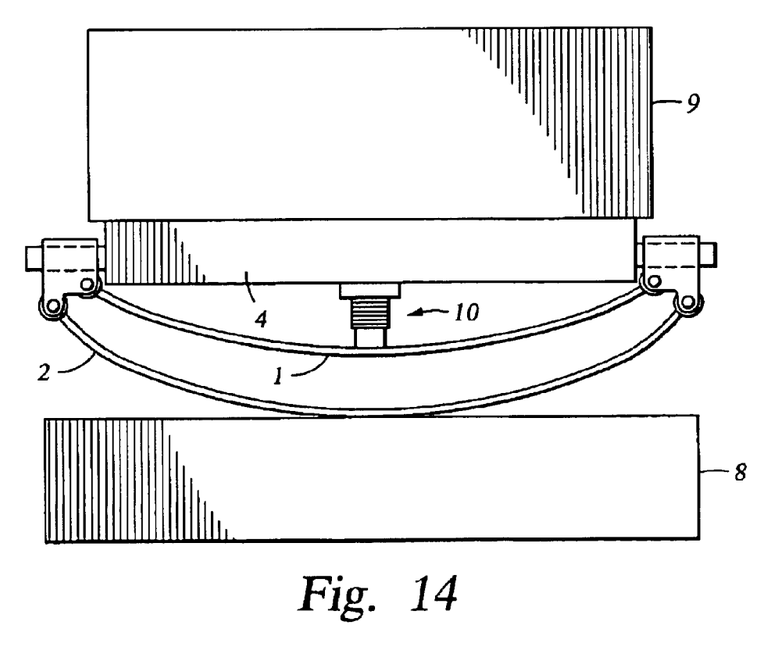
FIG. 14 shows an alternative inverted embodiment of the present invention.

FIG. 14 illustrates a further embodiment of a drive assembly with an inverted design. The driver 10 is above the first spring element 1. Because the driver 10 and frame 4 are often heavy, this design uses the mass of the driver 10 and frame 4 in conjunction with the reaction mass 9. Here, the second spring element 2 forces the baseplate 8. In alternate embodiments, both the single spring embodiments such as those illustrated in FIG. 8 and FIG. 12 and plural spring embodiments such as those illustrated in FIG. 3, FIG. 7, and FIG. 11 are inverted. The mechanics of the inverted design are the same as those described above, but with the mass of the frame 4 and driver 10 also used as added reaction mass 9.

Figure 15:
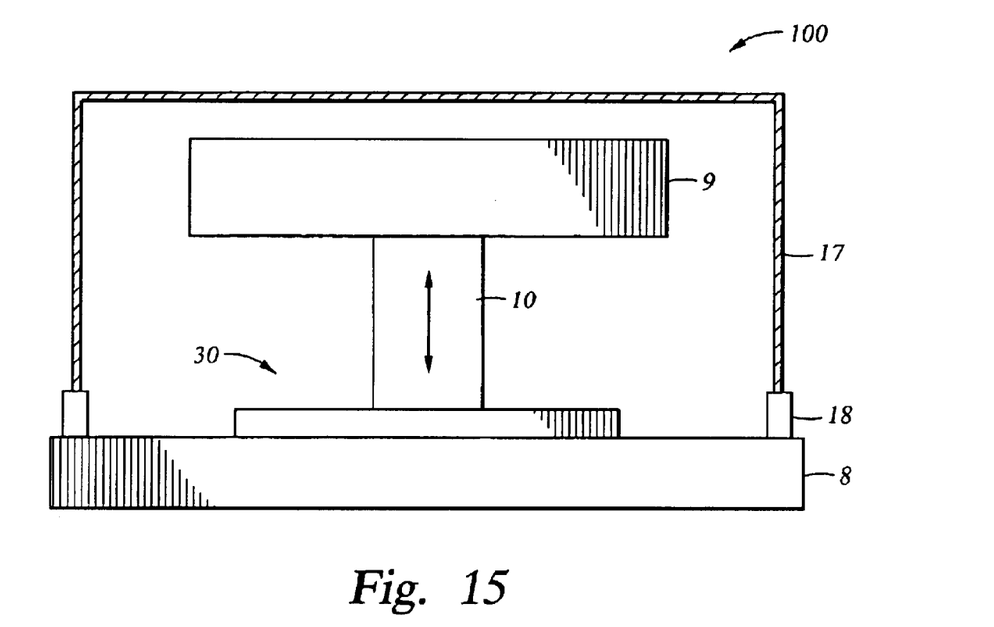
FIG. 15 shows an alternative water bottom embodiment of the present invention.

In still a further embodiment, a water bottom vibrator is provided. In conventional underwater vibroseis systems, waves are created by the entire surface of the vibrator. This is because the vibrator is submerged in water. Thus, the movement of the baseplate moves the entire vibrator causing all surfaces of the vibrator to move, thereby causing waves in all directions. The waves from the top of the vibrator are undesired because they often cause a ghosting problem. As illustrated in FIG. 15, a directional water vibrator 100 is provided. The vibrator 100 comprises a baseplate 8, a cover 17 and a decoupler 18. The decoupler 18 decouples the movement of the baseplate 8 from the movement of the cover 17. By decoupling the movement of the baseplate 8 from that of the cover 17 the water bottom vibrator 100 emits a substantially stronger signal from the baseplate 8 than the cover 17, and thus, is a directional water bottom vibrator 100. In alternate embodiments, the decoupler 18 comprises springs, hinges, pads, or any other decoupler 18 which will decouple the movement of the baseplate 8 from the movement of the cover 17 that would occur to those of ordinary skill in the art. In a further embodiment, the vibrator is water-tight within the cover. Other embodiments and designs of the vibrator 100 will occur to those of ordinary skill in the art. FIG. 15 illustrates a generalized drive assembly 30 with a generalized driver 10, between the reaction mass 9 and the baseplate 8.

Figure 16:
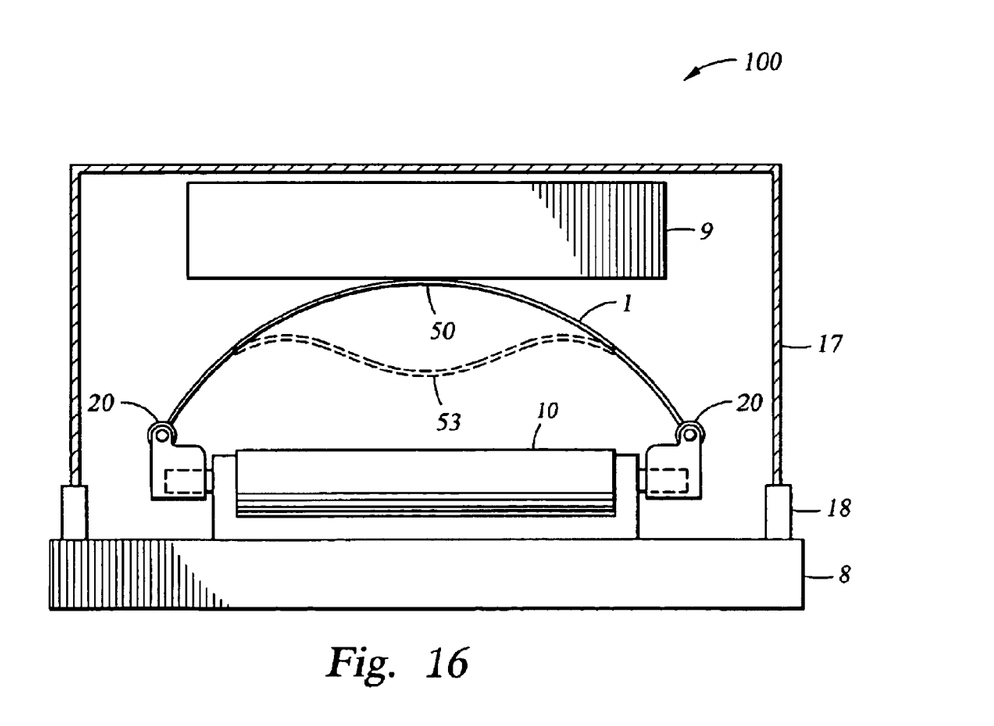
FIG. 16 shows an example single spring water bottom embodiment of the present invention.

In still a further embodiment, as illustrated in FIG. 16, the water bottom vibrator 100 further comprises a driver 10, a baseplate 8, a reaction mass 9, and at least a first spring element 1. The driver 10 forces the end 21 of the first spring element 1. In still a further embodiment, the first spring element 1 operates in at least two vibration modes 50, 53 in a seismic frequency band of interest. The first vibration mode 50 is illustrated with a solid line and the second vibration mode 53 is illustrated with a dotted line.

Figure 17:
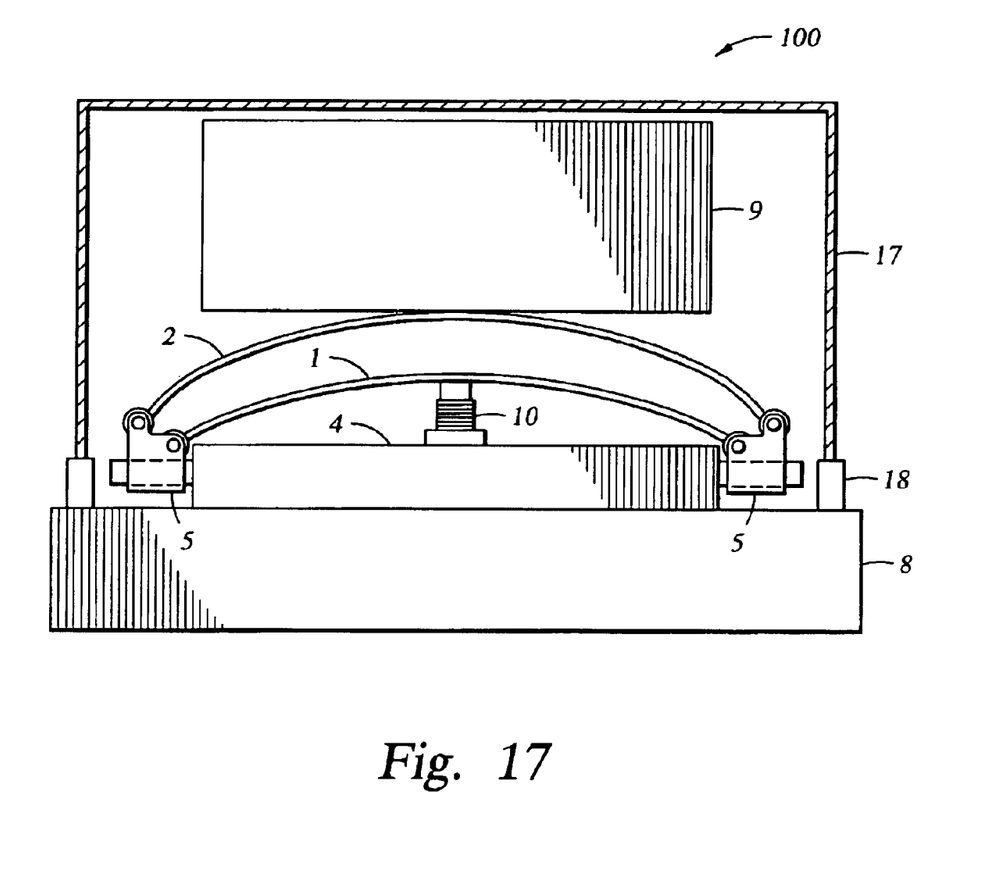
FIG. 17 shows an example plural spring water bottom embodiment of the present invention.

In yet a further embodiment, as illustrated in FIG. 17, the water bottom vibrator comprises a first spring element 1 and second spring element 2. The driver 10 is secured to the frame 4 and is in communication with the first spring element 1. The first spring element 1 is in communication with the second spring element 2. The second spring element 2 is in communication with the reaction mass 9. At least the first spring element 1 has a first resonance frequency in a first vibration mode in the seismic frequency band of interest. And at least the first spring element 1 has a second resonance frequency in a second vibration mode in the seismic frequency band of interest.

In a further embodiment, a system for generating a swept frequency signal in the earth is provided. The system comprises means for generating at least two resonance frequencies in a seismic frequency band of interest, and means for emitting the at least two resonance frequencies. In alternate embodiments, the means for generating at least two resonance frequencies comprises various combinations of components such as spring elements 1, 2, reaction masses 9, drivers 10, hinges 20, frames 4, fastening devices 5, transmission elements, flexible materials, rigid materials, or any other means for generating that will occur to those of ordinary skill in the art. In a further embodiment, means for generating comprises digital or electronic resonance frequency generators. In alternate embodiments, the means for emitting the at least two resonance frequencies comprises baseplates 8, speakers, sound emitting surfaces, or any other means for emitting that will occur to those of ordinary skill in the art.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

What is claimed is:

1. A drive assembly for imparting acoustic energy to the earth's surface, comprising:
    a baseplate;
    a reaction mass;
    a driver for imparting force to the baseplate, thereby transmitting acoustic energy into the earth, said driver being connected between the baseplate and the reaction mass by a spring; and
    said spring intrinsically having a first resonant frequency in a first vibration mode and a second resonant frequency in a second vibration mode, said first and second resonant frequencies being within a frequency band of interest.

2. The drive assembly of claim 1, wherein said spring comprises a first spring element.

3. The drive assembly of claim 1 wherein said spring comprises a first spring element and a second spring element, said second spring element being in communication with the first spring element.

4. The drive assembly of claim 3, wherein the second spring element is in communication with the reaction mass.

5. The drive assembly of claim 4, wherein the first spring element is in communication with the driver.

6. The drive assembly of claim 5, wherein the first spring element is bowed.

7. The drive assembly of claim 1, wherein the first spring element is bowed.

8. The drive assembly of claim 7, wherein the driver is in contact with at least one end of the first spring element.

9. The drive assembly of claim 1, wherein the driver further comprises an electrodynamic driver.

10. A water bottom vibrator assembly, the vibrator assembly comprising:
    a vibrator including a baseplate, said baseplate being adapted for transmitting seismic energy into the water bottom;
    a reaction mass;
    a driver for imparting force to the baseplate, thereby transmitting acoustic energy into the earth, said driver being connected between the baseplate and the reaction mass by a spring, said spring intrinsically having a first resonant frequency in a first vibration mode and a second resonant frequency in a second vibration mode, said first and second resonant frequencies being within a frequency band of interest;
    a cover for said vibrator connected to said baseplate by means of a decoupler; and
        wherein movement of the baseplate is decoupled by said decoupler from movement of the cover.

11. The vibrator of claim 10, wherein the vibrator is water-tight within the cover.

12. The drive assembly of claim 10 wherein said spring comprises a first spring element and a second spring element, said second spring element being in communication with the first spring element.

13. The drive assembly of claim 12, wherein the second spring element is in communication with the reaction mass.

14. The drive assembly of claim 13, wherein the first spring element is in communication with the driver.

15. The vibrator of claim 10, wherein the decoupler comprises springs.

16. The vibrator of claim 10, wherein the decoupler comprises pads.

* * * * *